United States Patent [19]
Kang

[11] Patent Number: 6,034,816
[45] Date of Patent: Mar. 7, 2000

[54] REAL IMAGE ZOOM FINDER

[75] Inventor: Hyoung-Won Kang, Kyungsangnam-do, Rep. of Korea

[73] Assignee: Samsung Aerospace Industries, Ltd., Kyungsangnam-do, Rep. of Korea

[21] Appl. No.: 09/112,292

[22] Filed: Jul. 9, 1998

[30] Foreign Application Priority Data

Jul. 9, 1997 [KR] Rep. of Korea ................ 97-31796

[51] Int. Cl.[7] .................................................. G02B 15/14
[52] U.S. Cl. ......................................... 359/432; 359/753
[58] Field of Search .............................................. 359/432

[56] References Cited

U.S. PATENT DOCUMENTS 5,257,129  10/1993  Morooka et al. ........................ 359/432

FOREIGN PATENT DOCUMENTS 4-238314  8/1992  Japan .

*Primary Examiner*—Georgia Epps
*Assistant Examiner*—Younggil Timothy Lee
*Attorney, Agent, or Firm*—Finnegan, Henderson, Farabow, Garrett & Dunner, L.L.P.

[57] ABSTRACT

The invention comprises a real image zoom finder including an objective lens group, an erecting group, and an eyepiece lens group. The objective lens group includes a first lens having a negative refractive power, a second lens having a positive refractive power, a third lens having a positive refractive power, and a fourth lens having a positive refractive power. The surface of the fourth lens closest to the image side of finder is convex and the second lens is biconvex. The real image zoom finder has a simple structure and good performance for all magnification ranges.

10 Claims, 6 Drawing Sheets

FIG.2A spherical aberration

FIG.2B astigmatism

FIG.2C distortion

FIG.3A spherical aberration

FIG.3B astigmatism

FIG.3C distortion

FIG.4A spherical aberration

FIG.4B astigmatism

FIG.4C distortion

FIG.6A spherical aberration

FIG.6B astigmatism

FIG.6C distortion

FIG.7A spherical aberration

FIG.7B astigmatism

FIG.7C distortion

FIG.8A spherical aberration

FIG.8B astigmatism

FIG.8C distortion

REAL IMAGE ZOOM FINDER

BACKGROUND OF THE INVENTION (a) Field of the Invention

The present invention relates to a finder, and, more particularly, to a real image zoom finder having its magnification varied by moving one or more optical elements.

(b) Description of the Related Art

Cameras are being made more compact and light-weight. Compact cameras require a small photographing system as well as a compact finder having a high magnification ratio.

The finder used in photographing systems generally comprises an objective lens group and an eyepiece lens group. An image of an object is formed through the objective lens group and is magnified by the eyepiece lens group, so that a user can observe the image of the object through the eyepiece lens group. However, without the eyepiece lens group, a user observes an inverted image because the objective lens group inverts the image upside down.

To make a camera as small as possible and to form an erect image, an optical system for erecting the inverted image formed through an objective lens group has been proposed. Such a system includes a finder using a mirror or a prism as an erecting system. Such a finder was disclosed in Japanese patent laid-open No. Hei 4-238314.

In this Japanese disclosure, an objective lens group includes first, second, third, and fourth lenses. The first lens has a negative refractive power. The second lens has a positive refractive power and varies the magnification of the lens group. The third lens has a positive refractive power and corrects aberration of the lens group. The fourth lens has a positive refractive power.

However, the disclosed finder is not suitable for a compact camera because a relatively long distance is required between a surface of the objective lens group closest to an object side and an image field. Also, the mechanical structure of the finder is complicated because the third lens moves a large distance, between 12 mm–21 mm. Consequently, it is difficult to manufacture the finder. In addition, it is difficult to manufacture the finder because each lens in the lens group is made of a different material.

SUMMARY OF THE INVENTION

The advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purposes of the invention, as embodied and broadly described herein, a real image zoom finder of the invention includes: an objective lens group, an erecting lens group, and an eyepiece lens group.

The objective lens group forms an inverted image and includes first, second, third, and fourth lenses. The first lens has a negative refractive power. The second lens, third lens, and fourth lens each has a positive refractive power. The first and fourth lenses are held stationary. The second and third lenses move along the optical axis when zooming from a wide-angle position to a telephoto position.

The erecting lens group forms an erect image by erecting the inverted image formed through the objective lens group.

The eyepiece lens group magnifies the erect image formed through the erecting lens group.

The real image zoom finder satisfies the following condition:

$$1.0 < f3/L < 5.0$$

where f3 represents the focal length of the third lens and L represents the distance between the surface of the objective lens group closest to an object side and the image field formed by the objective lens group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers and letters will be used throughout the drawings to refer to the same or like parts.

In first and second embodiments, according to the present invention, as shown in FIGS. 1A–1C and 5A–5C, a real image zoom finder includes an objective lens group I, an erecting lens group II, and an eyepiece lens group III arranged between an object side and an image side on the same optical axis.

The objective lens group I includes four lenses and has a positive refractive power. A first lens 1 has a negative refractive power and has a concave surface r2 facing the image side. A second lens 2 has a positive refractive power and is biconvex. A third lens 3 has a positive refractive power and has a concave surface facing the object side and a convex surface facing the image side. A fourth lens 4 has a positive refractive power and has a convex surface r8 facing the image side.

When zooming from a wide-angle position to a telephoto position, the first lens 1 and the fourth lens 4 are held stationary. The second lens 2 and the third lens 3 move along the optical axis of the finder. The second lens 2 moves to change the magnification of the finder. The third lens 3 moves to compensate for aberrations caused by the moving of the second lens 2.

The erecting lens group II consists of a prism. The eyepiece lens group III is biconcave and consists of a lens having a positive refractive power. All lenses in lens groups I, II, and III, according to a preferred embodiment of the invention, are made of the same material.

The real image zoom finder according to the present invention is operated as follows: the objective lens group I forms an inverted image of an object, the erecting lens group II forms an erected image by erecting the inverted image formed through the objective lens group I, and the eyepiece lens group III magnifies the erected image. Accordingly, a user can observe the erected image through the eyepiece lens group III.

In operation, the real image zoom finder satisfies the following conditions:

$$1.0 < f3/L < 5.0 \quad (1)$$

$$2.0 < f3/fe < 6.0 \quad (2)$$

where:

f3 represents the focal length of the third lens 3 of the objective lens group I;

fe represents the focal length of the eyepiece lens group III; and

L represents the distance between a surface r1 of the objective lens group I closest to the object side and an image field formed by the objective lens group I.

The image field is positioned between the objective lens group I and the erecting lens group II.

Condition (1) relates to the refractive power of the third lens 3 and miniaturization of the finder.

If the lower limit of condition (1) is violated, the total length of the objective lens group I, i.e., the distance between the surface r1 of objective lens group I closest to an object side and an image field formed by the objective lens group I, becomes large. Accordingly, violating this lower limit makes it difficult to realize a more compact finder.

If the upper limit of condition (1) is violated, the refractive power of the third lens 3 decreases, so that the refractive powers of the first lens 1, the second lens 2, and the fourth lens 4 increase. As a result, all aberrations increase.

Condition (2) relates to magnification.

If the lower limit of condition (2) is violated, the refractive power of the third lens 3 increases, thereby increasing all aberrations.

If the upper limit of condition (2) is violated, the focal length of the eyepiece lens group III becomes shorter, reducing the magnification of the object. Also, the apparent field decreases, making it more difficult to observe an object.

Because the real image zoom finder of the present invention satisfies condition 2, it has a wide apparent field.

Figure 1A:
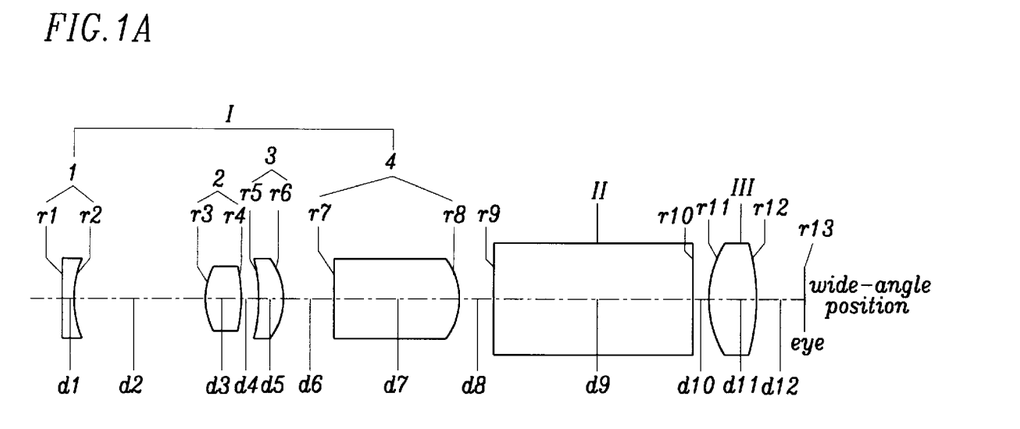
FIGS. 1A, 1B, and 1C show schematic sectional views of a real image zoom finder according to a first embodiment of the present invention at three positions.
Figure 1B:
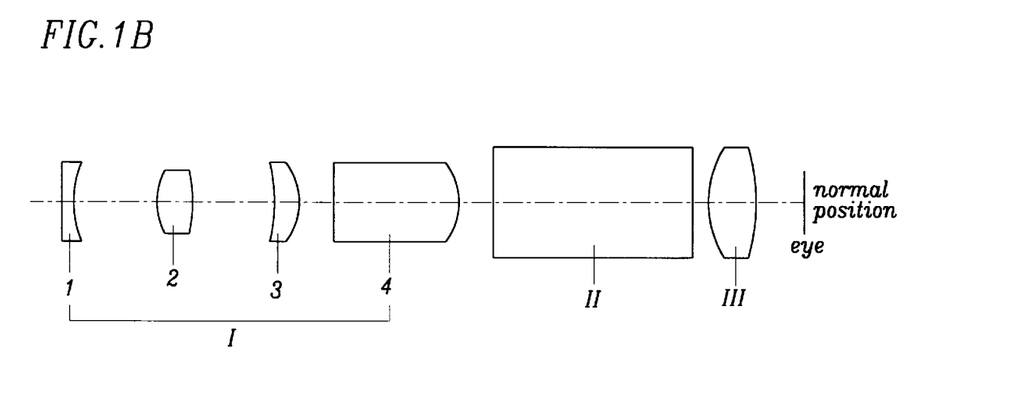
Figure 1C:
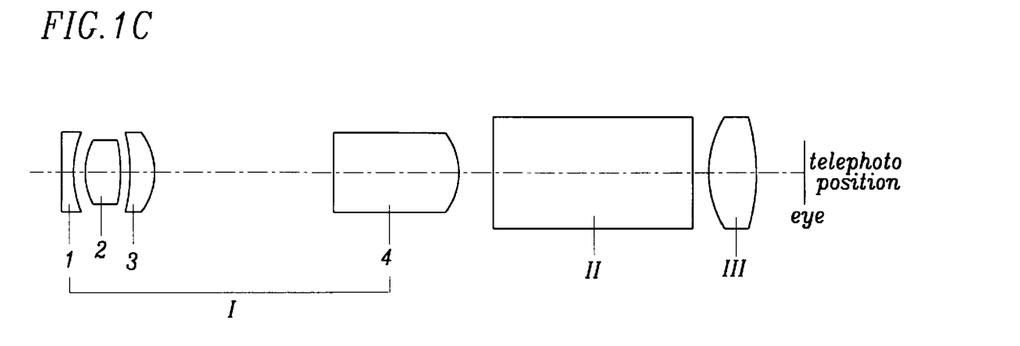
Figure 2A:
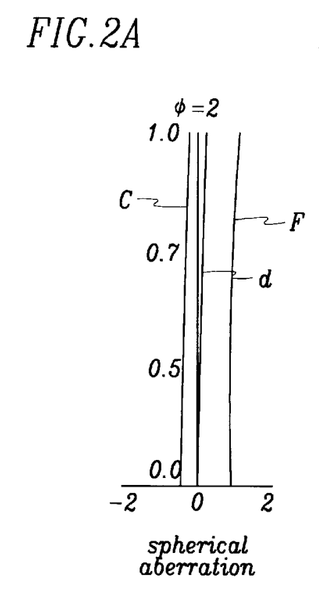
FIGS. 2A, 2B, and 2C show aberration curves of the real image zoom finder of FIG. 1A.
Figure 2B:
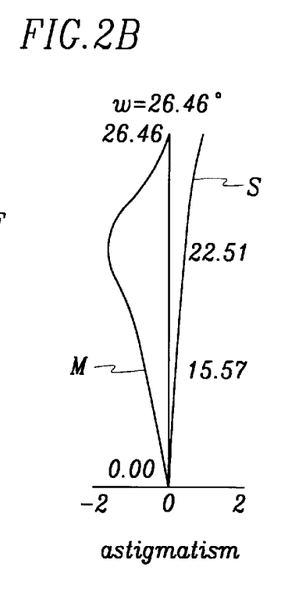
Figure 2C:
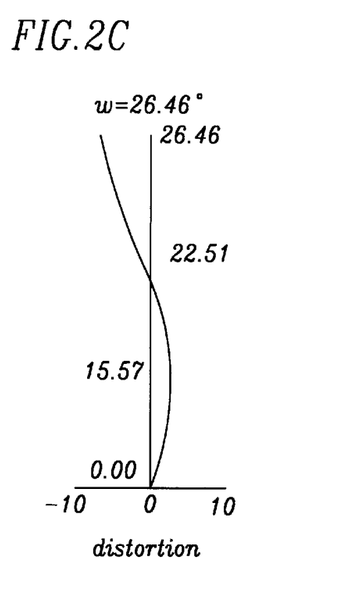
Figure 3A:
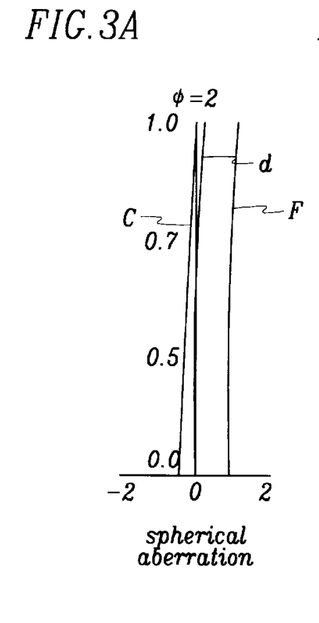
FIGS. 3A, 3B, and 3C show aberration curves of the real image zoom finder of FIG. 1B.
Figure 3B:
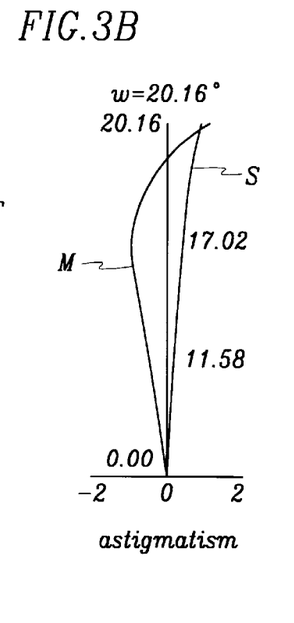
Figure 3C:
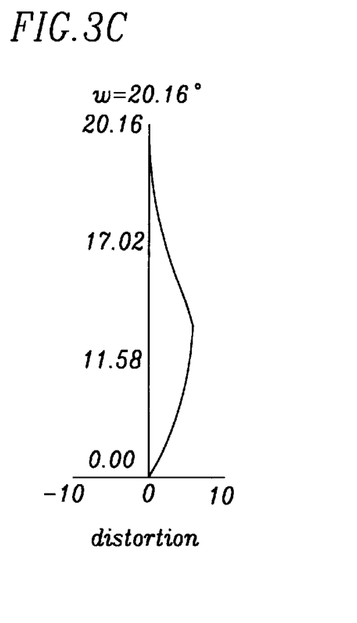
Figure 4A:
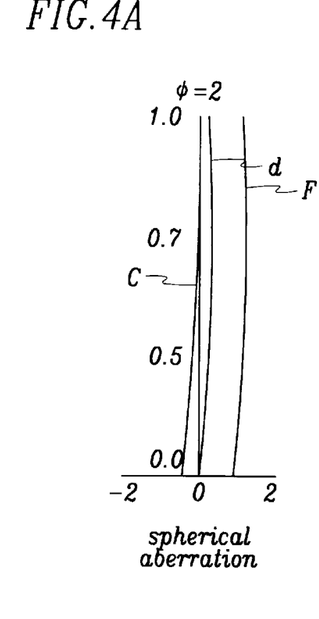
FIGS. 4A, 4B, and 4C show aberration curves of the real image zoom finder of FIG. 1C.
Figure 4B:
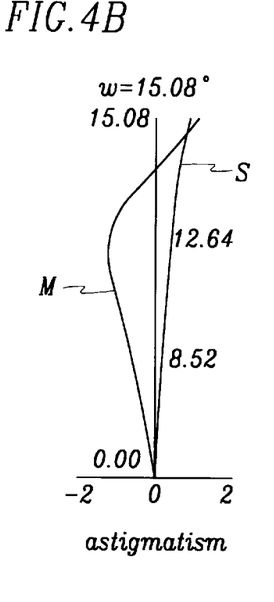
Figure 4C:
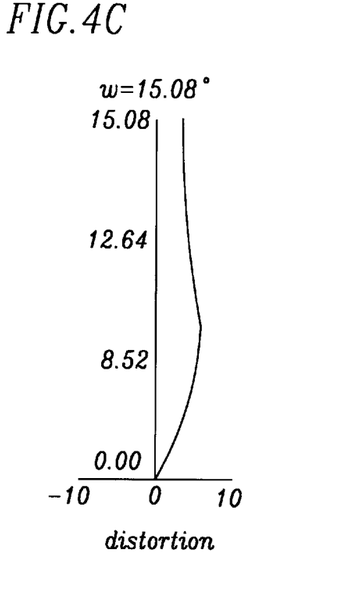

In accordance with the first preferred embodiment of the present invention, as embodied herein and shown generally in FIGS. 1A–1C, the second lens 2 moves toward the object side and the third lens 3 moves toward the image side when zooming from the wide-angle position to the normal position. The second lens 2 moves closer to the object side and the third lens 3 moves toward the object side when zooming from the normal position to the telephoto position.

All units of length are denominated in millimeters and the following variables are used:

ri(i=1~13) represents a radius of curvature of a refractive surface;

di(i=1~12) represents the thickness of a lens or the length between the lenses;

nd represents the d-line refractive index of a lens;

V represents the Abbe number of a lens;

2ω represents the viewing angle.

Table 1 shows generally data for the first embodiment of the present invention. The magnification ranges from 0.365 to 0.653. The viewing angle 2ω ranges from 52.92° to 30.160°.

TABLE 1

| Surface number i | Radius of curvature $r_i$ | Distance $d_i$ | Refractive index nd | Abbe number V |
|---|---|---|---|---|
| *1 | −9.104 | 0.700 | 1.49176 | 57.4 |
| 2 | 19.344 | A | | |
| 3 | 6.979 | 3.584 | 1.49176 | 57.4 |
| *4 | −10.575 | B | | |
| 5 | −35.417 | 2.000 | 1.49176 | 57.4 |
| *6 | −20.712 | C | | |
| 7 | ∞ | 12.000 | 1.49176 | 57.4 |
| *8 | −6.667 | 1.551 | | |
| 9 | ∞ | 23.620 | 1.49176 | 57.4 |
| 10 | ∞ | 1.916 | | |
| *11 | 11.096 | 4.000 | 1.49176 | 57.4 |
| 12 | −42.211 | 18.000 | | |
| 13 | ∞ | | | | where * indicates an aspherical surface. A coefficient of an aspherical lens of the real image zoom finder according to the first embodiment is expressed by the following evaluation:

$$Z = \frac{Cy^2}{1 + (1 - (K+1)C^2 y^2)^{1/2}} + A_4 y^4 + A_6 y^6 + A_8 y^8 + A_{10} y^{10}$$

where

Z represents the shortest distance from a perpendicular plane of a lens vertex to an optical axis, y represents a radial distance from the optical axis, C represents a reciprocal of a radius of curvature, K represents a conic constant, $A_4$, $A_6$, $A_8$, $A_{10}$ represent aspherical coefficients.

The coefficients of aspherical lens surfaces r1, r4, r6, r8m, and r11, are expressed in Table 2.

TABLE 2

| | Aspherical coefficients of the first surface r1 | Aspherical coefficients of the fourth surface r4 | Aspherical coefficients of the sixth surface r6 | Aspherical coefficients of the eighth surface r8 | Aspherical coefficients of the eleventh surface r11 |
|---|---|---|---|---|---|
| K | −0.9285902841722E +1 | −0.7449041975665E +1 | 0.6806235389866E +1 | −0.1000000000000E +3 | −0.1473025867643E +1 |
| A4 | −0.2242241799942E −3 | 0.2998089834919E −3 | 0.0000000000000 | 0.0000000000000 | 0.0000000000000 |
| A6 | −0.1157435703938E −2 | 0.4517975498725E −4 | 0.0000000000000 | 0.0000000000000 | 0.0000000000000 |

TABLE 2-continued

| | Aspherical coefficients of the first surface r1 | Aspherical coefficients of the fourth surface r4 | Aspherical coefficients of the sixth surface r6 | Aspherical coefficients of the eighth surface r8 | Aspherical coefficients of the eleventh surface r11 |
|---|---|---|---|---|---|
| A8 | 0.5369165411368E −3 | 0.0000000000000 | 0.0000000000000 | 0.0000000000000 | 0.0000000000000 |
| A10 | −0.7075128724504E −4 | 0.0000000000000 | 0.0000000000000 | 0.0000000000000 | 0.0000000000000 |

During zooming from a wide-angle position to a telephoto position according to the first embodiment of the present invention, distances A, B, and C change as expressed in Table 3.

TABLE 3

| | wide-angle position | normal position | telephoto position |
|---|---|---|---|
| A | 6.290 | 3.857 | 1.382 |
| B | 1.000 | 4.486 | 1.614 |
| C | 2.052 | 1.000 | 6.347 |

FIGS. 2A–4C illustrate superior aberration characteristics of the first embodiment at a wide-angle position, a normal position, and a telephoto position, respectively. In FIGS. 2A–4C, the following variables are used: S represents astigmatism in the sagittal direction; and M represents astigmatism in the tangential direction; E represents light having a 656.27 nm wavelength; F represents light having a 486.13 nm wavelength; G represents light having a 587.56 nm wavelength; $\phi$.represents a radius of exit pupil.

Figure 5A:
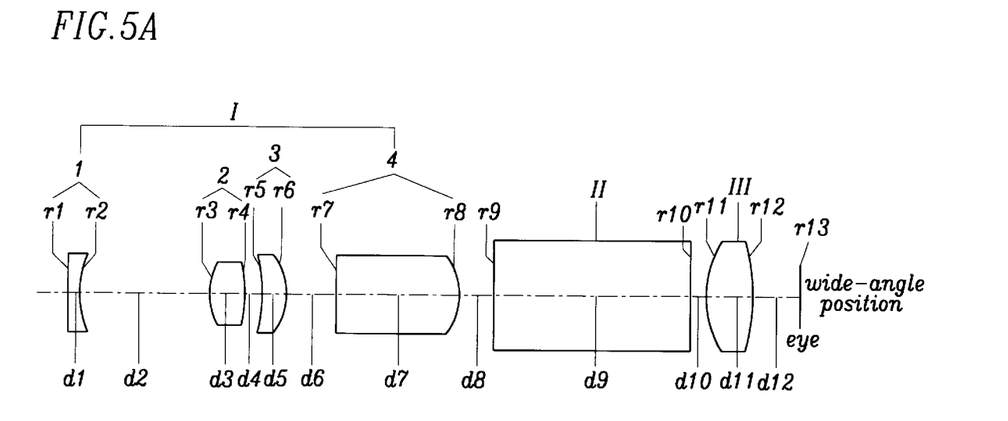
FIGS. 5A, 5B, and 5C show schematic sectional views of a real image zoom finder according to a second embodiment of the present invention at three positions.
Figure 5B:
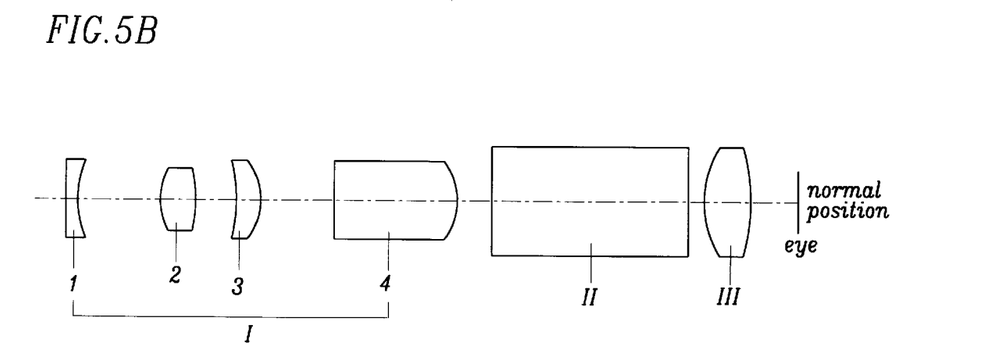
Figure 5C:
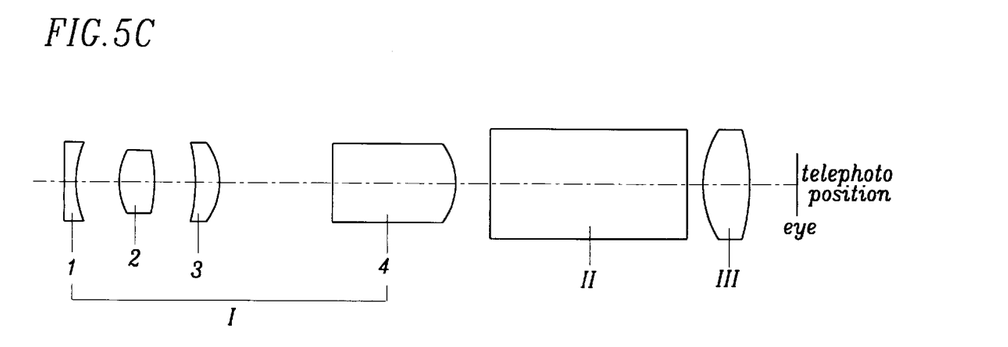
Figure 6A:
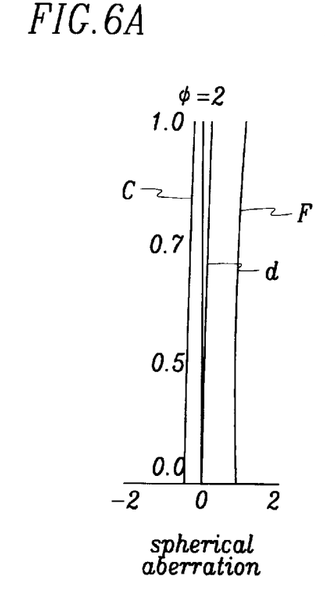
FIGS. 6A, 6B, and 6C show aberration curves of the real image zoom finder of FIG. 5A.
Figure 6B:
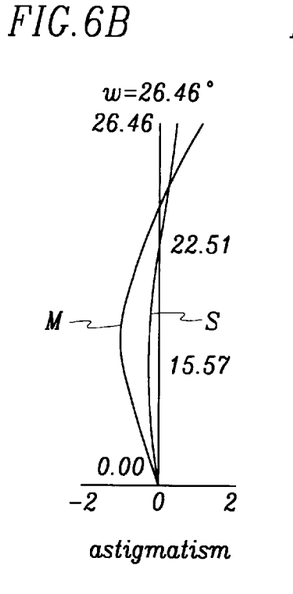
Figure 6C:
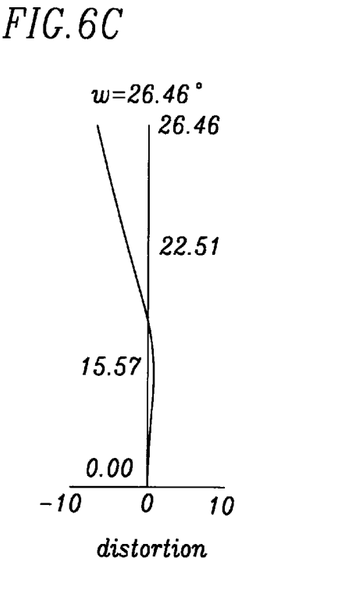
Figure 7A:
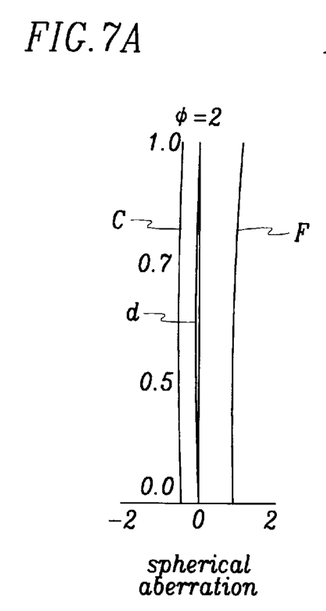
FIGS. 7A, 7B, and 7C show aberration curves of the real image zoom finder of FIG. 5B.
Figure 7B:
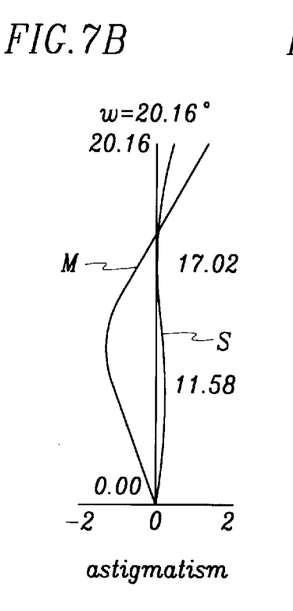
Figure 7C:
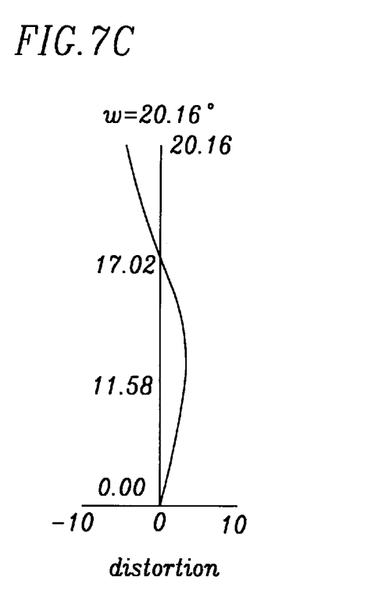
Figure 8A:
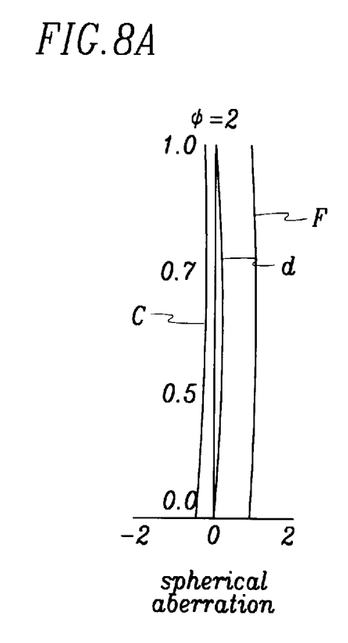
FIGS. 8A, 8B, and 8C show aberration curves of the real image zoom finder of FIG. 5C.
Figure 8B:
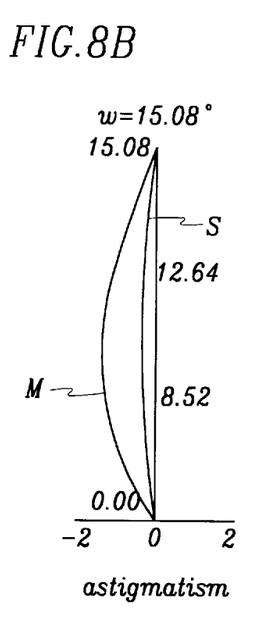
Figure 8C:
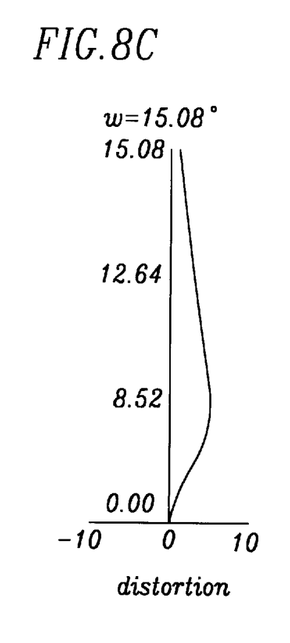

In accordance with the second preferred embodiment of the present invention, as embodied herein and shown generally in FIGS. 5A–5C, the second lens 2 and the third lens 3 move toward the object side when zooming from the wide-angle position to the telephoto position.

Table 4 shows data for the second embodiment of the present invention. Magnification ranges from 0.365 to 0.653. The viewing angle 2ω ranges from 52.92° to 30.16°.

TABLE 4

| Surface number i | Radius of curvature $r_i$ | Distance $d_i$ | Refractive index nd | Abbe number V |
|---|---|---|---|---|
| 1 | −18.306 | 0.700 | 1.49176 | 57.4 |
| 2 | 10.262 | A | | |
| 3 | 10.419 | 4.000 | 1.49176 | 57.4 |
| *4 | −14.535 | B | | |
| 5 | −141.693 | 4.000 | 1.49176 | 57.4 |
| *6 | −22.582 | C | | |
| 7 | ∞ | 14.000 | 1.49176 | 57.4 |
| *8 | −11.057 | 2.143 | | |
| 9 | ∞ | 23.500 | 1.49176 | 57.4 |
| 10 | ∞ | 1.850 | | |
| *11 | 13.149 | 3.152 | 1.49176 | 57.4 |
| 12 | −26.379 | 18.000 | | |
| 13 | ∞ | | | |

The coefficients of the aspherical lens surfaces are expressed in Table 5.

TABLE 5

| | Aspherical coefficients of the fourth surface | Aspherical coefficients of the sixth surface |
|---|---|---|
| K | −0.1080009907936E +2 | −0.63089828666961E +1 |
| A4 | −0.1395719330474E −3 | 0.0000000000000 |
| A6 | −0.5203581737973E −5 | 0.0000000000000 |

TABLE 5-continued

| A8 | 0.0000000000000 | 0.0000000000000 |
| A10 | 0.0000000000000 | 0.0000000000000 |

| | Aspherical coefficients of the eight surface | Aspherical coefficients of the eleventh surface |
|---|---|---|
| K | −0.1000000000000E +3 | −0.2582896930548E +1 |
| A4 | 0.0000000000000 | 0.0000000000000 |
| A6 | 0.0000000000000 | 0.0000000000000 |
| A8 | 0.0000000000000 | 0.0000000000000 |
| A10 | 0.0000000000000 | 0.0000000000000 |

During zooming from a wide-angle position to a telephoto position according to the embodiment of the present invention, distances A, B, and C change as expressed in Table 6.

TABLE 6

| | Wide-angle position | Normal position | Telephoto position |
|---|---|---|---|
| A | 12.593 | 8.947 | 5.751 |
| B | 2.456 | 5.469 | 4.885 |
| C | 2.105 | 2.740 | 6.516 |

FIGS. 6A to 8C illustrate superior aberration characteristics of the second embodiment at a wide-angle position, a normal position, and a telephoto position, respectively.

Values for conditions according to the first and second embodiments of the present invention are expressed in the following Table 7.

TABLE 7

| | First embodiment | Second embodiment |
|---|---|---|
| f1 | −12.487 | −13.265 |
| f3 | 97.088 | 54.029 |
| Fe | 18.320 | 18.326 |
| L | 29.177 | 41.998 |
| f3/L | 3.328 | 1.286 |
| f3/fe | 5.300 | 2.948 |

As described above, the present invention comprises a real image zoom finder which is compact and has a simple structure. The real image zoom finder of the present invention has a good aberration performance for all magnification ranges and uses inexpensive material. Also, the lenses used have relatively simple shapes. Thus, because the number of lenses having aspherical surfaces is kept to a minimum, it is easy to manufacture the real image zoom finder.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A real image zoom finder having an image side and an object side, comprising:

an objective lens group forming an inverted image, the objective lens group including a first lens having a negative refractive power, a second lens having a positive refractive power, a third lens having a positive refractive power, and a fourth lens having a positive refractive power;

an erecting lens group for forming an erect image by erecting the inverted image formed through the objective lens group; and an eyepiece lens group for magnifying the erect image formed through the erecting lens group;

wherein the first lens and the fourth lens are held stationary, the second lens and the third lens move along the optical axis when zooming from a wide-angle position to a telephoto position, and the real image zoom finder satisfies the following condition:

$$1.0 < f3/L < 5.0$$

where f3 represents a focal length of the third lens and L represents a distance between a surface of the objective lens group closest to the object side and an image field formed by the objective lens group.

2. The real image zoom finder of claim 1, wherein the real image zoom finder further satisfies the following condition:

$$2.0 < f3/fe < 6.0$$

where fe represents a focal length of the eyepiece lens group.

3. The real image zoom finder of claim 1, wherein the surface of the fourth lens closest to the image side is convex.

4. The real image zoom finder of claim 1, wherein all of the lenses in the lens groups are made of the same material.

5. The real image zoom finder of claim 1, wherein the second lens is bioconvex.

6. The real image zoom finder of claim 1, wherein the second lens moves toward the object side and the third lens moves toward the image side when zooming from the wide-angle position to the normal position, and the second lens further moves toward the object side and the third lens moves toward the object side when zooming from the normal position to the telephoto position.

7. The real image zoom finder of claim 1, wherein the second lens and the third lens move toward the object side when zooming from the wide angle position to the telephoto position.

8. The real image zoom finder of claim 1, wherein the first lens is concave forward the image side.

9. The real image zoom finder of claim 1, wherein the third lens is concave toward the object side and convex toward the image side.

10. The real image zoom finder of claim 1, wherein each lens of the objective lens group comprises a single lens.

* * * * *

UNITED STATES PATENT AND TRADEMARK OFFICE
CERTIFICATE OF CORRECTION

PATENT NO.  : 6,034,816
DATED       : March 7, 2000
INVENTOR    : Hyoung-Won KANG It is certified that error appears in the above-identified patent and that said Letters Patent is hereby corrected as shown below:

Claim 8, Col. 8, line 21, "forward" should read --toward--.

Signed and Sealed this

Twenty-fourth Day of April, 2001

Attest:

NICHOLAS P. GODICI

Attesting Officer

Acting Director of the United States Patent and Trademark Office